US010421430B2

(12) United States Patent
Maemura et al.

(10) Patent No.: US 10,421,430 B2
(45) Date of Patent: Sep. 24, 2019

(54) SEATBELT RETRACTOR (71) Applicant: AUTOLIV DEVELOPMENT AB, Vargarda (SE)

(72) Inventors: Eiji Maemura, Yokohama (JP); Andreas Lucht, Yokohama (JP); Patrick Sullau, Yokohama (JP); Yukinori Midorikawa, Yokohama (JP)

(73) Assignee: AUTOLIV DEVELOPMENT AB, Vargarda (SE)

( * ) Notice: Subject to any disclaimer, the term of this patent is extended or adjusted under 35 U.S.C. 154(b) by 69 days.

(21) Appl. No.: 15/580,581

(22) PCT Filed: May 2, 2016

(86) PCT No.: PCT/JP2016/063585
§ 371 (c)(1),
(2) Date: Dec. 7, 2017

(87) PCT Pub. No.: WO2016/199525
PCT Pub. Date: Dec. 15, 2016

(65) Prior Publication Data
US 2018/0178750 A1 Jun. 28, 2018

(30) Foreign Application Priority Data

Jun. 8, 2015 (JP) ................................. 2015-116092
Jan. 27, 2016 (JP) ................................. 2016-013571

(51) Int. Cl.
*B60R 22/46* (2006.01)
(52) U.S. Cl.
CPC ........ *B60R 22/46* (2013.01); *B60R 2022/468* (2013.01); *B60R 2022/4666* (2013.01)
(58) Field of Classification Search
CPC .............. B60R 22/46; B60R 2022/468; B60R 2022/4666
See application file for complete search history.

(56) References Cited

U.S. PATENT DOCUMENTS 7,533,842 B2 * 5/2009 Saito ....................... B60R 22/44
192/56.1
7,934,673 B2 * 5/2011 Saito ....................... B60R 22/44
242/374
(Continued)

FOREIGN PATENT DOCUMENTS

CN 101678815 A 3/2010
CN 101932480 A 12/2010
(Continued)

OTHER PUBLICATIONS

International Search Report of PCT/JP2016/063585, dated Jul. 5, 2016.

*Primary Examiner* — Sang K Kim
(74) *Attorney, Agent, or Firm* — Brinks Gilson & Lione (57) ABSTRACT A power transmission mechanism (19) for transmitting power from a motor (34) to a spindle (12) having a clutch housing (50), a pawl (41) engageable with the clutch housing (50), a gear wheel (57) which holds the pawl (41) and rotates with the rotation of the motor (34), an outer gear cover (26), and a friction ring (42) engaging with the pawl (41) and held on the outer gear cover (26) by frictional force. The friction ring (42) is provided with a protruding portion (42*a*) which engages with an engagement groove (41*b*) of the pawl (41), and a plurality of contact pieces (42*b*) in contact with an outer peripheral surface of a small diameter ring portion (26*c*) of the outer gear cover (26) and press radially against the outer peripheral surface towards an inner side The friction ring can be easily coupled to the outer gear cover.

11 Claims, 11 Drawing Sheets

(56) References Cited

U.S. PATENT DOCUMENTS

| | | | |
|---|---|---|---|
| 8,469,301 B2 * | 6/2013 | Maemura | B60R 22/46 242/374 |
| 2009/0294565 A1 | 12/2009 | Ouchi et al. | |
| 2012/0211579 A1 | 8/2012 | Maemura et al. | |

FOREIGN PATENT DOCUMENTS

| | | | |
|---|---|---|---|
| CN | 102666215 | A | 9/2012 |
| EP | 2246225 | A1 | 3/2010 |
| EP | 2497693 | A1 | 9/2012 |
| JP | 2009-078633 | A | 4/2009 |
| JP | 2009-286213 | A | 12/2009 |
| JP | 2011-162157 | A | 8/2011 |
| JP | 2012-162264 | A | 8/2012 |
| JP | 5388042 | B2 | 1/2014 |
| JP | 5428080 | B2 | 2/2014 |
| JP | 2014-218133 | A | 11/2014 |
| JP | 5648924 | B2 | 7/2015 |
| KR | 10-2012-0076369 | A | 7/2012 |
| WO | WO 2008/149746 | A1 | 12/2008 |
| WO | WO 2009/101992 | A1 | 8/2009 |
| WO | WO 2011/055763 | A1 | 5/2011 |
| WO | WO 2011/059010 | A1 | 5/2011 |

* cited by examiner

SEATBELT RETRACTOR

CROSS-REFERENCE TO RELATED APPLICATIONS

This application is a 35 U.S.C. § 371 national phase application of PCT International Application No. PCT/JP2016/063585, filed May 2, 2016, which claims the benefit of priority under 35 U.S.C. § 119 to Japanese Patent Application No. 2016-013571, filed Jan. 27, 2016, and Japanese Patent Application No. 2015-116092, filed Jun. 8, 2015, the contents of which are incorporated herein by reference in their entirety.

FIELD OF THE INVENTION

The present invention relates to a seatbelt retractor, and particularly to a seatbelt retractor capable of retracting slack of a seatbelt by rotating a spindle using an electric actuator.

BACKGROUND

In conventional seatbelt retractors, a sudden deceleration state of a vehicle is detected by a sensor, whereupon a spindle is rotated in a retraction direction by a motor. When there is a possibility of a collision, a seatbelt is retracted by a prescribed amount so as to lightly restrain an occupant often (referred to as "pretensioning") and, when a collision occurs, an explosive pretensioner is operated so as to forcibly retract the seatbelt referred to as pretensioning, whereby the occupant is securely protected.

Further, in seatbelt retractors, a power transmission mechanism for transmitting power from a motor to a spindle is provided with a clutch mechanism which transmits power from the motor to the spindle/interrupts the transmission of power from the motor to the spindle in order to prevent rotation on a spindle side from being transmitted to the motor due to the operation of the pretensioner.

Figure 11:
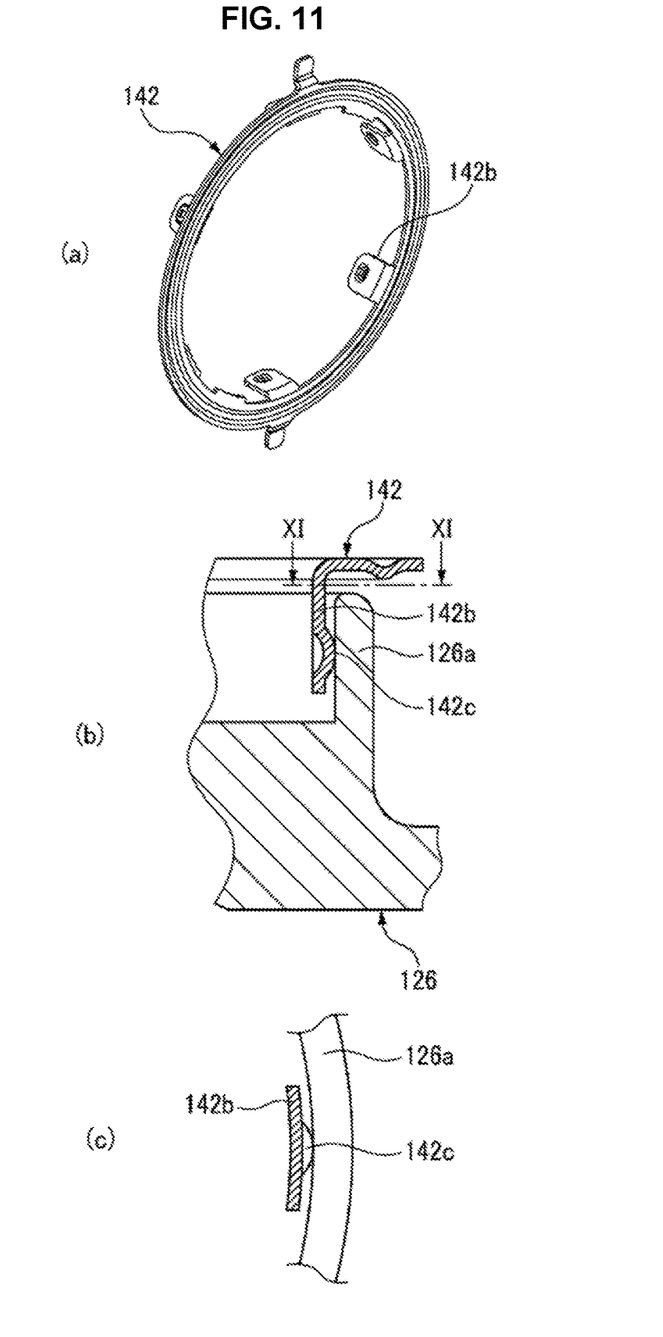
FIG. 11(a) is a perspective view of a conventional friction ring.
FIG. 11(b) is a main part cross-sectional view showing a state in which a protruding portion of a friction ring is in contact with an inner peripheral surface of a cylindrical portion of an outer gear cover.
FIG. 11(c) is a main part cross-sectional view taken along the XI-XI line shown in FIG. 11(b).

For example, in the seatbelt retractor described in Japanese Patent Publication No. 2011-162157, a pawl arranged in a pawl sliding groove of a gear wheel is used to engage/disengage a clutch housing and a gear wheel arranged so as to oppose each other, thereby switching between transmission and interruption of power of a motor which rotates the gear wheel. In addition, the pawl is held, via a friction ring, in an outer gear cover which houses the clutch housing and the gear wheel. As shown in FIG. 11(a) to FIG. 11(c) provided with this specification, the prior art teaches a friction ring 142 for holding a pawl has a plurality of claw portions 142b, each having a substantially hemispherical protruding portion 142c which protrudes towards an outer side in a radial direction. The claw portions 142b are pressed against a convex portion 126a provided on an outer gear cover 126 and the protruding portions 142c are brought into contact with an inner peripheral surface of the convex portion 126a, whereby the friction ring 142 is held on the outer gear cover 126 due to frictional force.

SUMMARY OF INVENTION

However, in the above-described prior art reference, when the claw portions 142b of the friction ring 142 are coupled to the convex portion 126a of the outer gear cover 126, the claw portions 142b must be temporarily contracted and then set, necessitating a contraction operation and requiring, to a certain extent, a high level of worker skill during assembly of the retractor.

The present invention has been made in view of the circumstance outlined above, and an object thereof is to provide a seatbelt retractor in which a friction ring can be easily coupled to an outer gear cover.

The object described above of the present invention is achieved by the following configuration:

In a first aspect of the invention, a seatbelt retractor is provided with;
a spindle for retracting a seatbelt,
an electric actuator which generates power for rotating the spindle, and
a power transmission mechanism which is capable of transmitting power from the electric actuator to the spindle,
the power transmission mechanism including
a clutch housing which rotates together with the spindle and includes a portion to be engaged,
a pawl which includes a first engaging portion that is capable of engaging with the portion to be engaged of the clutch housing,
a gear wheel which includes a holding portion for holding the pawl so as to be movable, is disposed so as to oppose the clutch housing, and rotates in accordance with the rotation of the electric actuator,
an outer gear cover which houses the clutch housing and the gear wheel, and
a friction ring which engages with the pawl while allowing relative movement of the pawl in a radial direction and is held on the outer gear cover due to frictional force, wherein
a clutch mechanism, which switches between a mode in which power from the electric actuator can be transmitted to the spindle and a mode in which the transmission of power from the electric actuator to the spindle can be interrupted, by engagement/disengagement between the portion to be engaged of the clutch housing and the first engaging portion of the pawl, and
the friction ring is provided with another engaging portion which engages with a second engaging portion of the pawl so as to allow relative movement of the pawl in the radial direction, and a plurality of contact pieces which come into contact with an outer peripheral surface of a cylindrical portion formed on the outer gear cover and press against the outer peripheral surface towards an inner side in the radial direction.

In a second aspect of the present invention, a seatbelt retractor is provided as described above further wherein; the frictional force acts between the outer peripheral surface of the cylindrical portion of the outer gear cover and the contact pieces of the friction ring.

In a third aspect of the present invention, a seatbelt retractor is provided as described above further wherein; each of the contact pieces extends in an axial direction from an inner diameter side of an annular plate portion of the friction ring, and includes a contact portion which extends in a tangential direction of the outer peripheral surface of the cylindrical portion, and the contact portions press against the outer peripheral surface of the cylindrical portion towards the inner side in the radial direction.

In a fourth aspect of the present invention, a seatbelt retractor is provided as described above further wherein; an opening is formed in each of the contact pieces.

In a fifth aspect of the present invention, a seatbelt retractor is provided as described above further wherein; the opening is formed at least between an inner diameter side end portion of the annular plate portion and the contact portion in the extension direction of the contact piece.

In a sixth aspect of the present invention, a seatbelt retractor is provided as described above further wherein; the outer gear cover is provided with another cylindrical portion which is formed concentrically with the cylindrical portion on an outer side of the cylindrical portion in the radial direction, and the gear wheel is fitted to the other cylindrical portion so as to be freely rotatable.

In a seventh aspect of the present invention, a seatbelt retractor is provided as described above further wherein; the second engaging portion is an engagement groove formed in the pawl, and the other engaging portion is a protruding portion formed on the friction ring.

In an eighth aspect of the present invention, a seatbelt retractor is provided as described above further wherein; the protruding portion is inclined with respect to a horizontal plane of an annular plate portion of the friction ring in a direction separating from the engagement groove.

In a ninth aspect of the present invention, a seatbelt retractor is provided as described above further wherein; the friction ring is heavier than one of the pawls.

In the tenth aspect of the present invention, a seatbelt retractor is provided as described above further wherein; the portion to be engaged of the clutch housing is an inner tooth formed on an inner peripheral side of the clutch housing, and the first engaging portion of the pawl is a structure which is capable of meshing with the inner tooth.

With the seatbelt retractor of the present invention, a power transmission mechanism for transmitting power from an electric actuator to a spindle is provided with a clutch housing, a pawl which is capable of engaging with the clutch housing, a gear wheel which holds the pawl and rotates in accordance with the rotation of the electric actuator, an outer gear cover, and a friction ring which engages with the pawl and is held on the outer gear cover due to frictional force. The friction ring is provided with another engaging portion which engages with a second engaging portion of the pawl, and a plurality of contact pieces which come into contact with an outer peripheral surface of a cylindrical portion of the outer gear cover and press against the outer peripheral surface towards an inner side in the radial direction. Accordingly, the friction ring can be easily coupled to the outer gear cover while the pawl is held due to the contact between the outer peripheral surface of the cylindrical portion and the contact pieces and, as a result, automation of the coupling operation can be easily addressed. Moreover, as contact between the outer peripheral surface of the cylindrical portion and the contact pieces is tangential contact, resistance to abrasion is improved and durability is enhanced.

DETAILED DESCRIPTION

Next, a seatbelt retractor according to one embodiment of the present invention will be described in detail with reference to the drawings.

Figure 1:
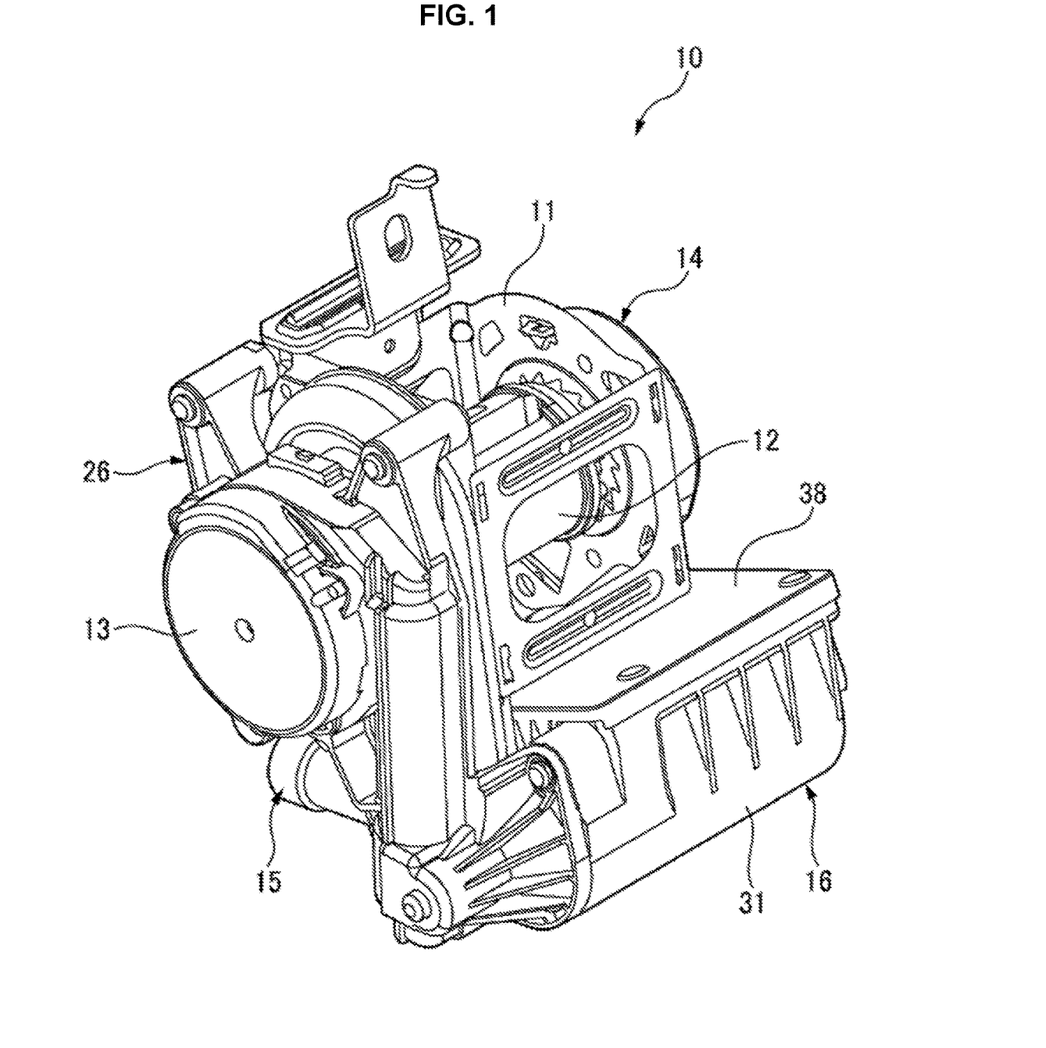
FIG. 1 is a perspective view of a seatbelt retractor according to the present invention.
Figure 2:
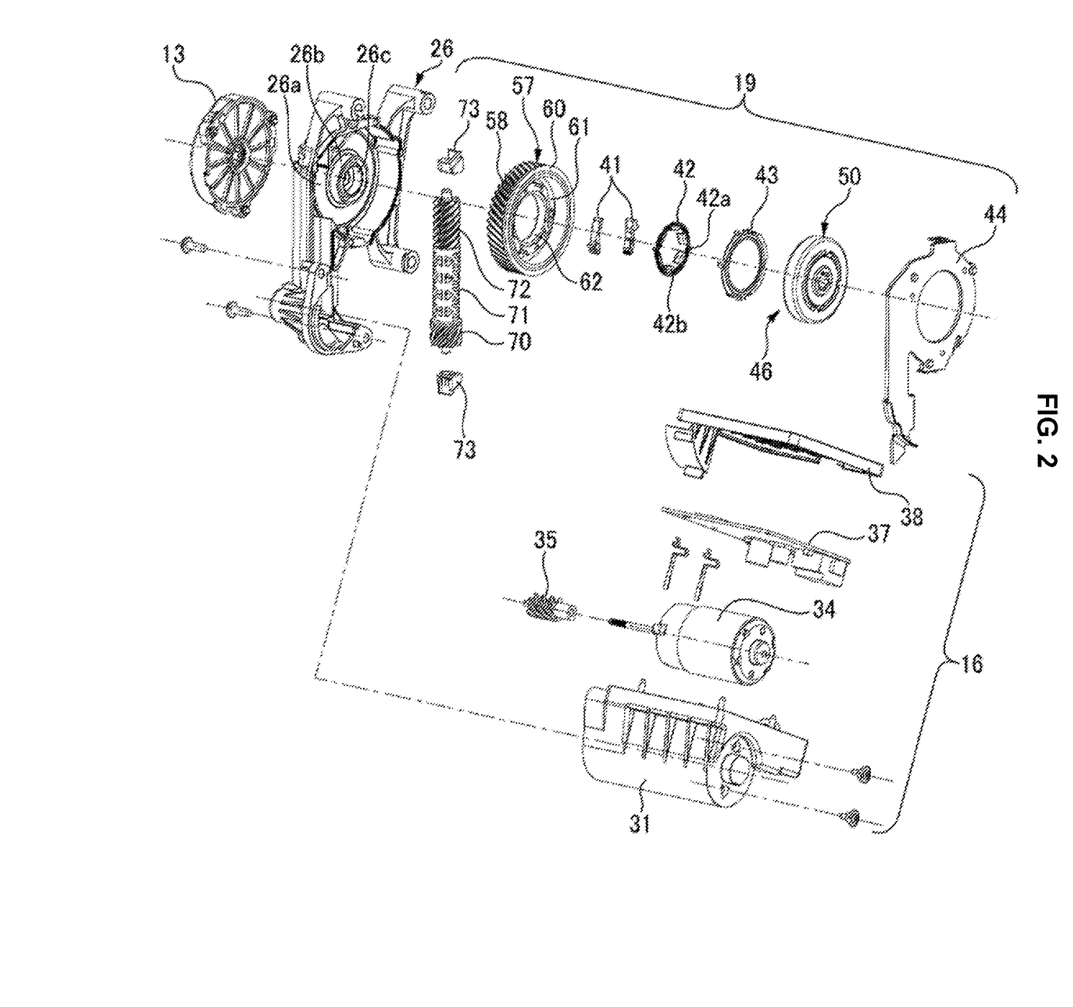
FIG. 2 is an exploded perspective view showing an electric actuator and a power transmission mechanism.

As shown in FIG. 1 and FIG. 2, a seatbelt retractor 10 of the present embodiment includes a spindle 12 for retracting a seatbelt (not shown), a retraction spring device 13 for biasing the spindle 12 in a seatbelt retraction direction, a locking mechanism 14 for locking a withdrawal operation of the seatbelt in accordance with acceleration detected by an acceleration sensor (not shown), a motor 34, that is, an electric actuator which generates power for rotating the spindle 12, a pretensioner 15 which generates other power for rotating the spindle 12, and a power transmission mechanism 19 which is capable of transmitting power from the motor 34 to the spindle 12.

Both ends of the spindle 12 are held so as to be rotatable by the retractor frame 11. A torsion bar (not shown), which constitutes an energy absorption mechanism, is provided in the spindle 12. The torsion bar is connected, at a first end side thereof (left end side in FIG. 1), to the spindle 12, and is connected, at a second end side thereof (right end side in FIG. 1), to a tread head (not shown) to which force from the pretensioner 15 is input.

The pretensioner 15 forcefully ejects balls (not shown) using gas generated due to the ignition of a combustible material, whereby the balls move along grooves of a pinion (not shown). Rotation of the pinion is transmitted to the tread head, the torsion bar, and the spindle 12 via the locking mechanism 14, whereby the seatbelt is retracted.

An outer gear cover 26, to which a motor assembly 16 is attached and in which the power transmission mechanism 19 is housed, is attached to the left side surface of the retractor frame 11 in the drawing. Further, the retraction spring device 13 is attached to the left side surface of the outer gear cover 26.

The motor assembly 16, which is located below the retractor frame 11, is constituted by a motor case 31, a motor 34, a first gear 35, a drive circuit board 37, and a case cover 38. Note that the first gear 35 is attached to the rotating shaft of the motor 34 and meshes with a second gear 70 of the power transmission mechanism 19.

In the power transmission mechanism 19, the second gear 70, which meshes with the first gear 35, is attached to a first end of a support shaft 71, a third gear 72 is attached to a second end of the support shaft 71, and the third gear 72 meshes with a final gear 58 formed on the outer peripheral surface of a gear wheel 57. The support shaft 71 is held so as to be freely rotatable in the outer gear cover 26 by a pair of bearings 73. Note that, in the present embodiment, the gear assembly is constituted by the first gear 35, the second gear 70, the third gear 72, and the final gear 58.

Further, as shown in FIG. 1 and FIG. 2, a clutch mechanism 46, which constitutes the power transmission mechanism 19, is constituted by the gear wheel 57, which has the final gear 58 formed on the outer peripheral surface thereof, a pair of pawls 41, a friction ring 42, a cover ring 43, a gear cover 44, and a clutch housing 50.

Figure 3:
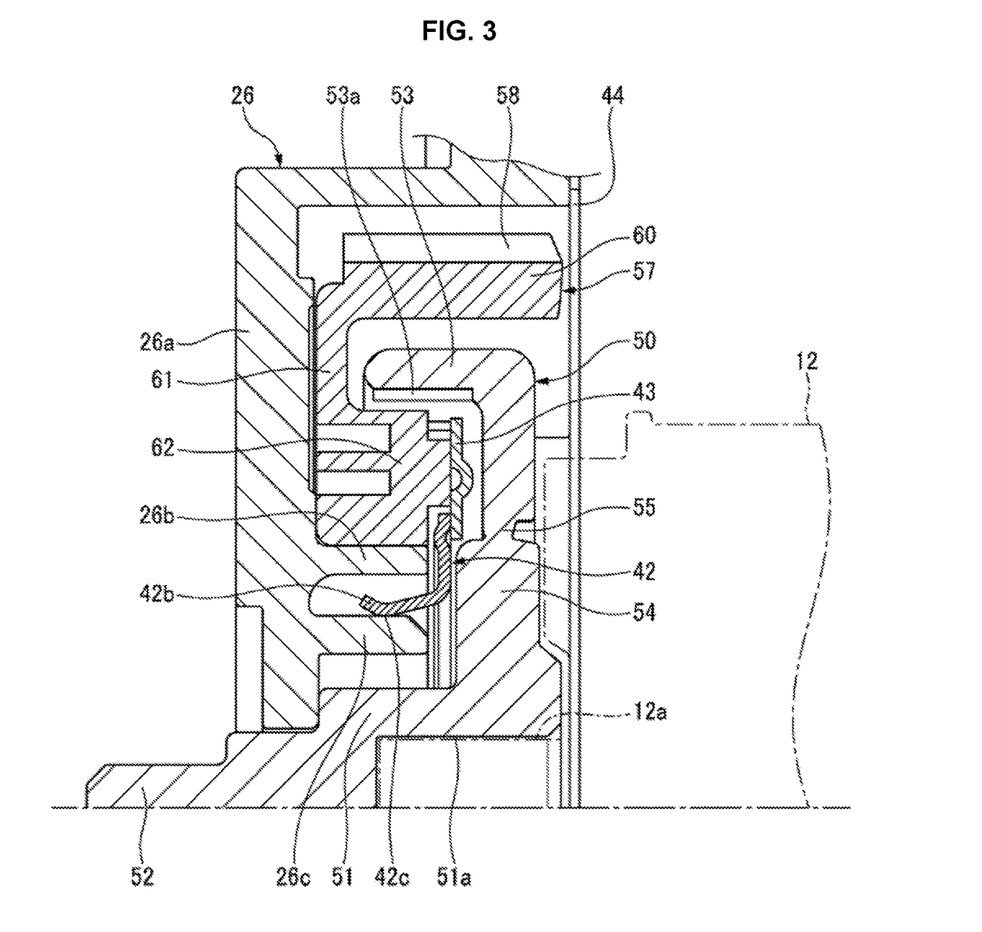
FIG. 3 is a main part cross-sectional view showing the power transmission mechanism.
Figure 4:
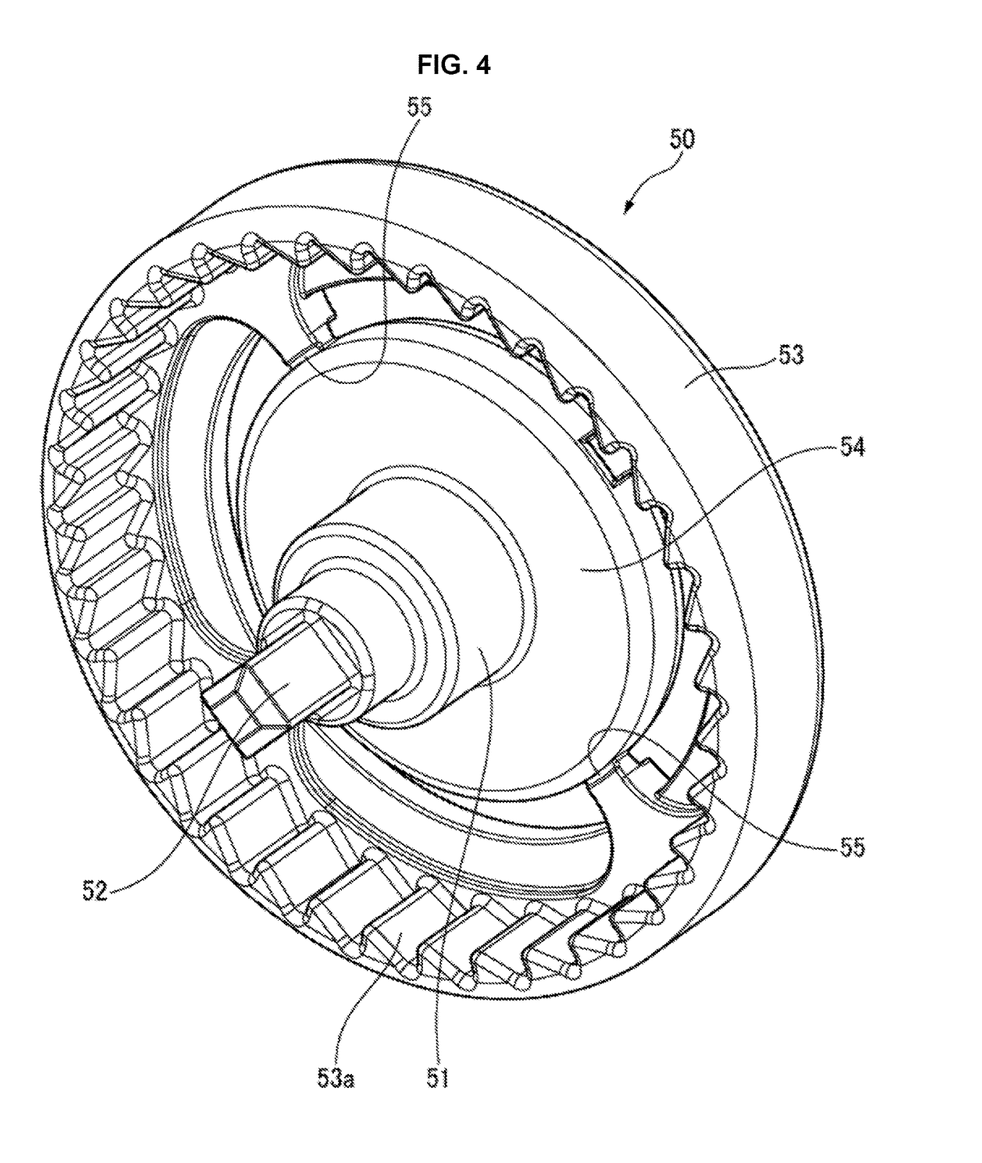
FIG. 4 is a perspective view of a clutch housing.

As shown in FIG. 3 and FIG. 4, the clutch housing 50 includes a boss portion 51, an square shaft 52 which extends in the axial direction from the center of the boss portion 51, a circular portion 53 provided with inner teeth 53a, that is, portions to be engaged for the pawls 41 to engage with, which are formed on an inner peripheral surface thereof, a flange portion 54 formed outward from the boss portion 51 in the radial direction, and a plurality of thin fracturing portions 55 which connect the circular portion 53 and the flange portion 54 at a plurality of locations (four locations in the present embodiment) in the circumferential direction.

A male spline 12a of the spindle 12 is spline-fitted to a female spline 51a formed in a spindle 12 side of the boss portion 51. As a result, the clutch housing 50 rotates integrally with the spindle 12. Further, a spring core (not shown) of the retraction spring device 13 is fitted to the square shaft 52 of the clutch housing 50 so as to constantly bias the spindle 12 in the retraction direction.

The gear wheel 57 has a large diameter side cylindrical portion 60, which includes the final gear 58 formed on an outer peripheral surface thereof, an inwardly directed collar portion 61 which extends towards an inner diameter side from a portion of the large diameter side cylindrical portion 60 that is closer to the other end thereof in the axial direction (closer to the outer gear cover 26), and a small diameter side cylindrical portion 62 which extends from an inner diameter portion of the inwardly directed collar portion 61 towards the retractor frame 11 and has a shorter length in the axial direction than the large diameter side cylindrical portion 60.

As shown in FIG. 3, the circular portion 53 of the clutch housing 50 is inserted, from the retractor frame 11 side towards the inwardly directed collar portion 61, between the small diameter side cylindrical portion 62 and the large diameter side cylindrical portion 60, so that the clutch housing 50 is housed in the gear wheel 57. As a result, the inner peripheral surface of the large diameter side cylindrical portion 60 opposes the outer peripheral surface of the circular portion 53 of the clutch housing 50 so as to be freely rotatable relative thereto, and the outer peripheral surface of the small diameter side cylindrical portion 62 opposes the inner teeth 53a formed on the inner peripheral surface of the clutch housing 50 so as to be freely rotatable relative thereto.

The inner peripheral surface of the small diameter side cylindrical portion 62 is fitted, so as to be freely rotatable, onto a large diameter ring portion 26b which is formed concentrically with the clutch housing 50 and extends from the side wall 26a of the outer gear cover 26 towards the direction of the clutch housing 50. Note that a small diameter ring portion 26c, which has a smaller diameter than that of the large diameter ring portion 26b, is formed concentrically thereto on the side wall 26a of the outer gear cover 26 on an inner diameter side of the large diameter ring portion 26b.

Figure 7:
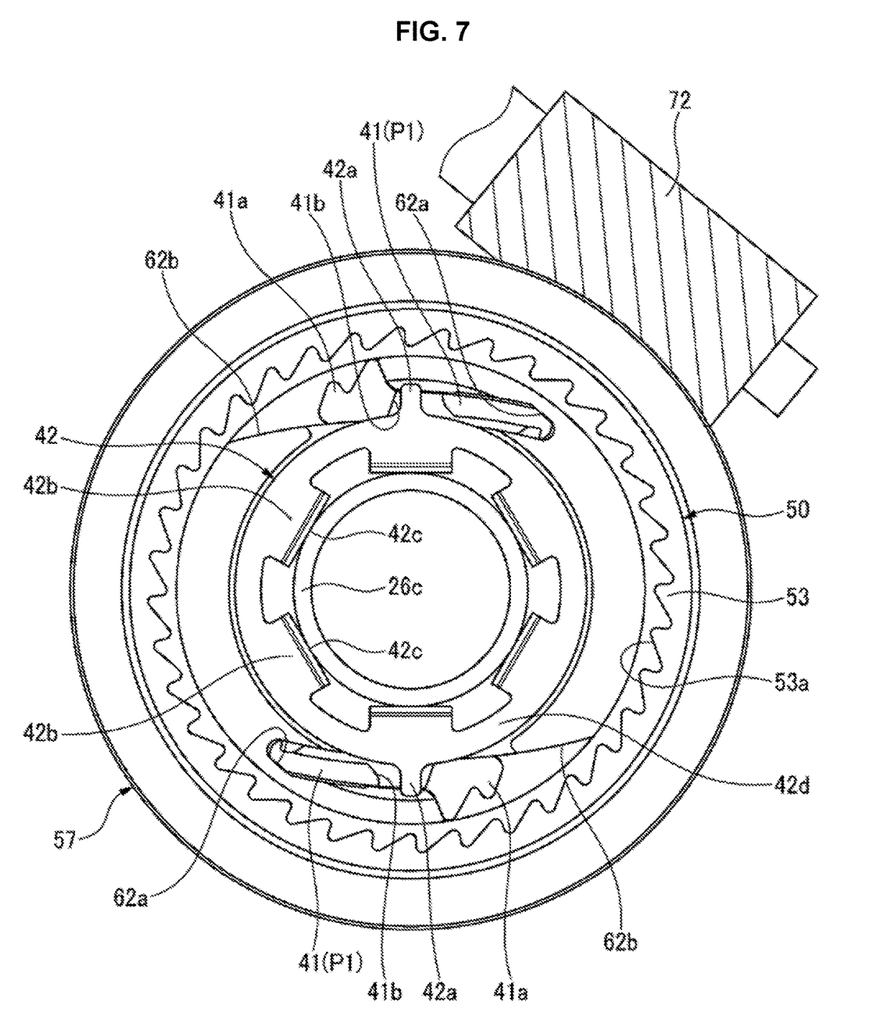
FIG. 7 is a diagram for explaining a disengaged state of a clutch when a motor is not being operated.

As shown in FIG. 7, a pair of pawl sliding grooves 62a are formed in the outer peripheral portion of the small diameter side cylindrical portion 62 of the gear wheel 57, the pawl sliding grooves 62a serving as holding portions for holding the pair of pawls 41 at an end surface of the small diameter side cylindrical portion 62 on a gear cover 44 side. The pair of pawl sliding grooves 62a each include an opening 62b, which opens such that an engaging portion (first engaging portion) 41a of the pawl 41 faces the inner teeth 53a of the clutch housing 50 at a counter position (position rotated by 180°) to the outer peripheral surface of the small diameter side cylindrical portion 62, and extend from the openings 62b in mutually opposing directions so as to conform to the shape of the pawls 41.

Each of the pair of pawls 41 includes an engaging portion 41a at a first end side thereof, forms a curved shape which curves gently from the first end side thereof to a second end side thereof, and is held so as to be slidable in the pawl sliding groove 62a. Each of the pair of pawls 41 moves, in the pawl sliding groove 62a, between a first position P1 (see FIG. 7) at which the pawl 41 is located when the motor 34 is not in operation, and a second position P2 (see FIG. 9) at which the pawl 41 is located when the motor 34 is in operation and the engaging portion 41a is engaged with the inner teeth 53a of the clutch housing 50.

Figure 5:
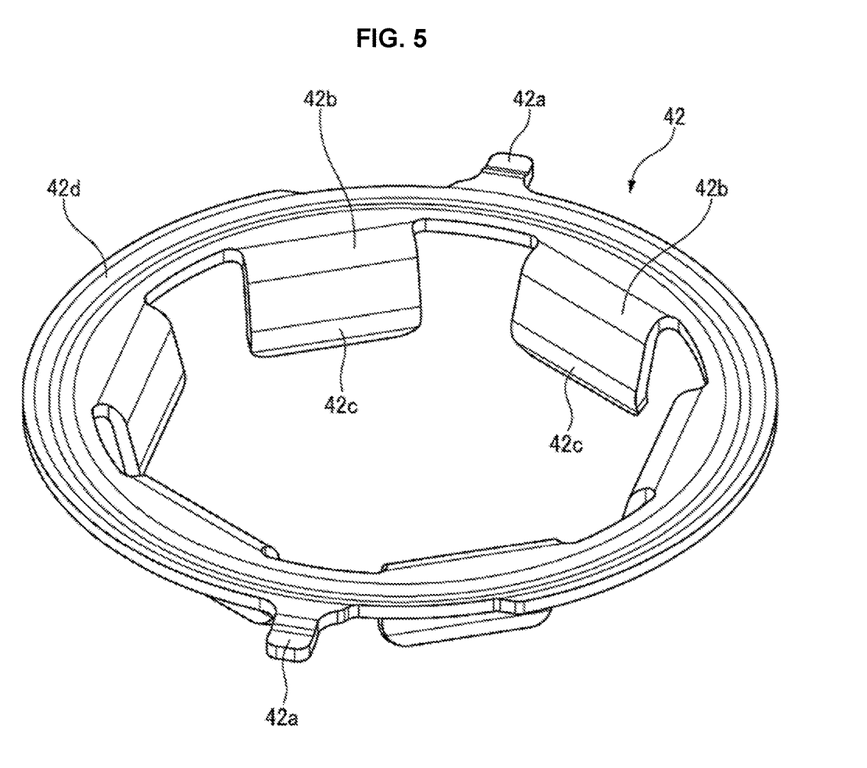
FIG. 5 is a perspective view of a friction ring.
Figure 6:
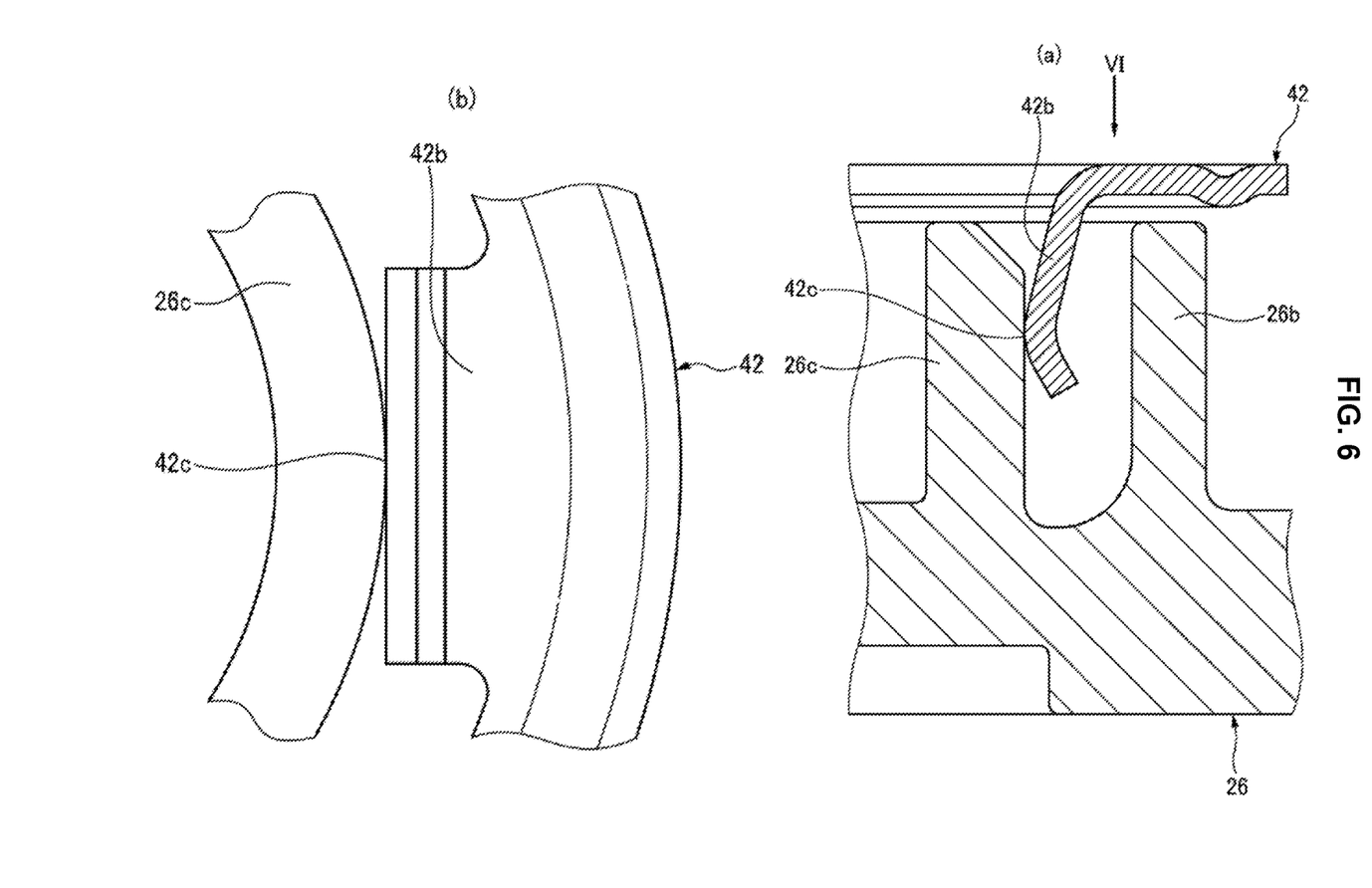
FIG. 6(a) is a main part side view showing a state in which a contact piece of the friction ring is in contact with an outer peripheral surface of a cylindrical portion of an outer gear cover.
FIG. 6(b) is a main part cross-sectional view as seen from direction VI shown in FIG. 6(a).

Referring to FIG. 5 and FIGS. 6(a) and 6(b), the friction ring 42 is provided with an annular plate portion 42d, a pair of protruding portions (other protruding portions) 42a which protrude towards an outer side in the radial direction from counter positions (180° phase) on the outer diameter side of the annular plate portion 42d, and a plurality (six in the present embodiment) of contact pieces 42b which extend in the axial direction from the inner diameter side of the annular plate portion 42d, and is formed from a single plate-shaped member. Each of the contact pieces 42b is formed by bending, in the axial direction, a plate-shaped portion that extends towards an inner side from the inner diameter side of the annular plate portion 42d and has a predetermined width. More specifically, each of the contact pieces 42b is formed so as to have a substantially V-shaped cross section which extends in the axial direction while inclining slightly towards an inner side in the radial direction and then reverses so as to incline towards an outer side in the radial direction. The portion at which the inclination is reversed continues smoothly due to a curved surface 42c. Accordingly, the curved surface 42c has the same prescribed width as the contact piece 42b, and is formed so as to extend linearly in the tangential direction of the outer peripheral surface of the small diameter ring portion 26c.

The friction ring 42 presses against the outer peripheral surface of the small diameter ring portion 26c, which is a non-driving portion formed on the outer gear cover 26, towards an inner side in the radial direction due to the biasing force of the contact pieces 42b themselves. More specifically, the curved surfaces 42c of the friction ring 42 make tangential contact with the outer peripheral surface of the small diameter ring portion 26c due to the elastic force of the contact pieces 42b. As a result, when the contact pieces 42b of the friction ring 42 are subject to a force in the rotational direction, frictional force is generated in a direction opposite to the rotational direction between the contact pieces 42b and the small diameter ring portion 26c of the outer gear cover 26, and the friction ring 42 is held on the small diameter ring portion 26c due to this frictional force. By simply pressing the friction ring 42, having formed thereon each of the contact pieces 42b having a substantially V-shaped cross section, straight towards the small diameter ring portion 26c of the outer gear cover 26 from the axial direction, each of the contact pieces 42b comes into tangential contact with the outer peripheral surface of the small diameter ring portion 26c, whereby the friction ring 42 is set on the outer gear cover 26. For this reason, the coupling operation of the friction ring 42 to the outer gear cover 26 may be automated.

Further, the pair of protruding portions 42a of the friction ring 42 are held in the respective engagement grooves (second engaging portions) 41b of the pawls 41 (see FIG. 7). Moreover, the side of the friction ring 42 is covered with a cover ring 43 (see FIG. 3).

Further, the friction ring 42 is configured to be heavier than one of the pawls 41. If the friction ring 42 is lighter than the weight of one of the pawls 41 then, when the friction ring 42 begins to rotate, friction ring 42 will be affected by the weight of the pawls 41, making it difficult for the friction ring 42 to operate properly. Accordingly, the weight of the friction ring 42 is set to be heavier than one of the pawls 41 in order to facilitate proper operation thereof.

Next, operation of the seatbelt retractor 10 of the present embodiment will be described. When the possibility of a collision is detected by a monitoring sensor or the like (not shown), the motor 34 is driven by an ECU (not shown) prior to collision, thereby rotating the spindle 12 via the power transmission mechanism 19 and retracting the seatbelt. Further, when there is no longer a possibility of collision, the motor 34 is rotated in the opposite direction, thereby returning the seatbelt retractor 10 to a state in which the seatbelt can be withdrawn. During a collision, however, the pretensioner 15 operates so as to forcibly retract the seatbelt.

Here, operation of the clutch mechanism 46 will be described with reference to FIG. 7 to FIG. 9. First, as shown in FIG. 7, when retraction by the motor 34 is not being performed, the pawl 41 is positioned at the innermost portion of the pawl sliding groove 62a, the engaging portion 41a of the pawl 41 is located further towards an inner diameter side than the inner teeth 53a of the clutch housing 50, and the clutch housing 50 and the pawl 41 are not engaged with each other. For this reason, only the clutch housing 50, which is integral with the spindle 12, is rotatable and normal retraction and withdrawal of the seatbelt is possible.

Figure 8:
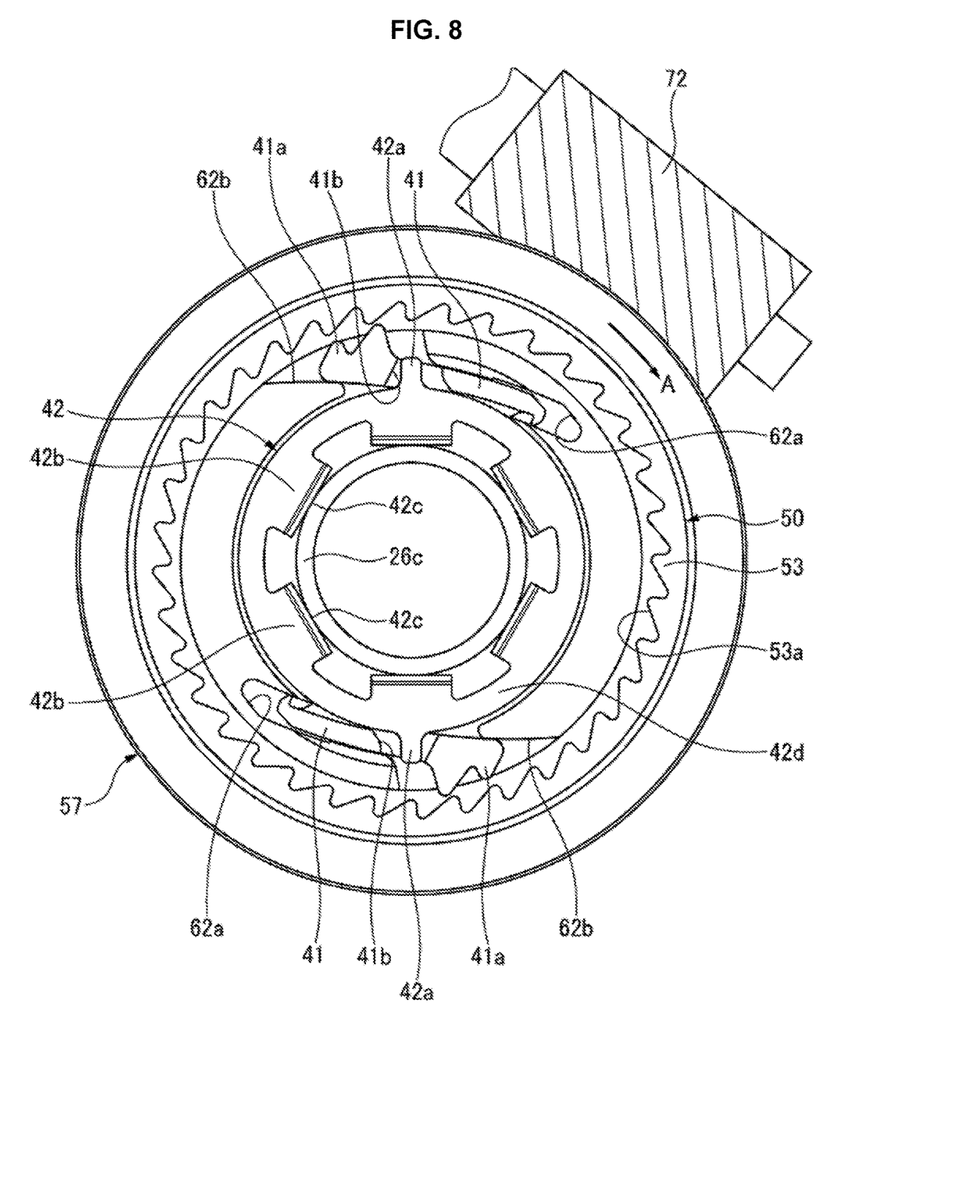
FIG. 8 is a diagram for explaining a state in which a gear wheel rotates due to power from the motor, and a pawl and the clutch housing begin to engage.

When the motor 34 rotates towards the retraction side, the driving force transmitted to the second gear 70 from the first gear 35 attached to the rotating shaft of the motor 34 is transmitted from the third gear 72 to the final gear 58, and the gear wheel 57 rotates clockwise (arrow A) as shown in FIG. 8. At such time, each of the pawls 41 held due to engagement between the pair of protruding portions 42a of the friction ring 42 and the engagement grooves 41b is biased by the frictional force between the friction ring 42 and the small diameter ring portion 26c of the outer gear cover 26 so as to remain in place. Accordingly, as the gear wheel 57 rotates in the clockwise direction, the pawl 41 moves relatively towards the opening 62b from the innermost portion in the pawl sliding groove 62a.

Figure 9:
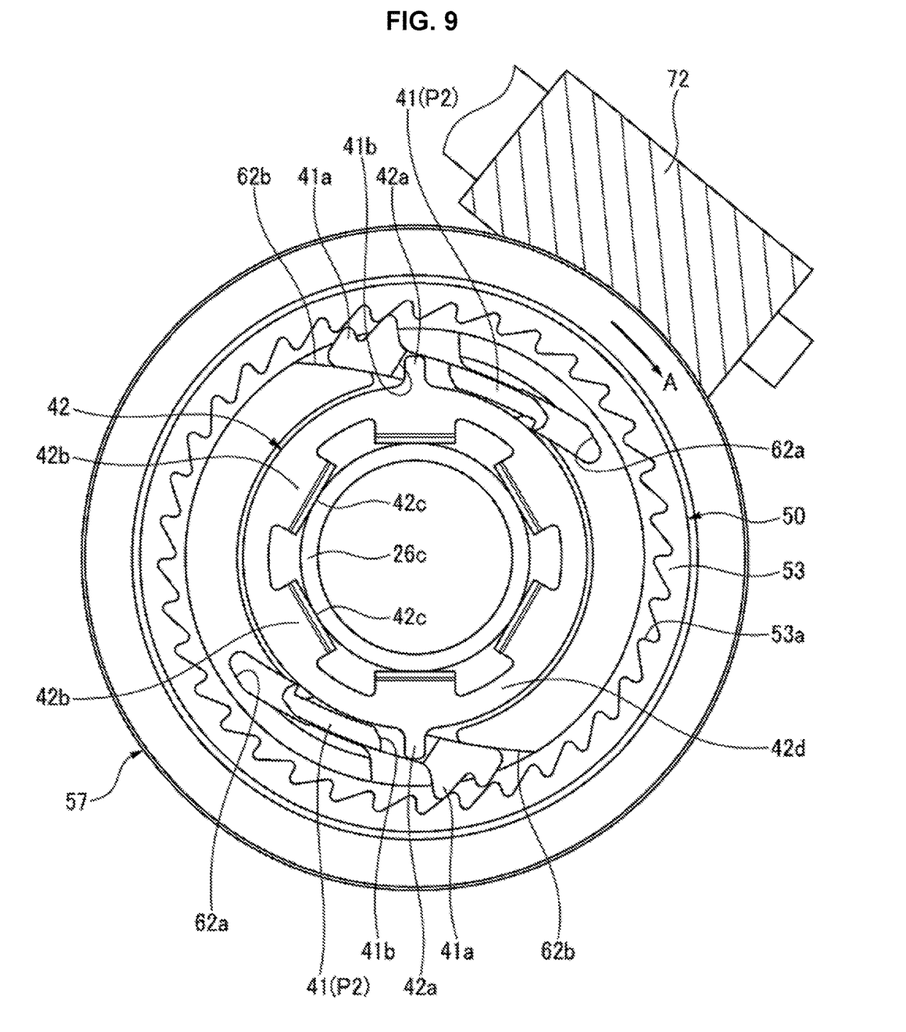
FIG. 9 is a diagram for explaining a state in which the gear wheel further rotates so that that the pawl and the clutch housing engage.

As shown in FIG. 9, when the gear wheel 57 rotates by a predetermined angle, the engaging portion 41a of the pawl 41 moves beyond the opening 62b and engages with the inner teeth 53a of the clutch housing 50.

When the gear wheel 57 further rotates beyond the predetermined angle in the seatbelt retraction direction (arrow A), the gear wheel 57, the clutch housing 50, the friction ring 42, and the pawl 41 integrally rotate in the retraction direction (arrow A) in a state where the engaging portion 41a of the pawl 41 and the inner teeth 53a of the clutch housing 50 are engaged, the power from the motor 34 is transmitted to the spindle 12, and the seatbelt is retracted.

At this time, the contact pieces 42b of the friction ring 42 slide on the outer peripheral surface of the small diameter ring portion 26c of the outer gear cover 26 against the frictional force between the contact pieces 42b and the small diameter ring portion 26c. However, the curved surface 42c of the contact piece 42b, which comes into contact with the outer peripheral surface of the small diameter ring portion 26c, provides a larger contact area than in a conventional friction ring 142 (see FIGS. 11(a) to 11(c)) in which contact is performed by a substantially hemispherical protruding portion 142c. For this reason, even when the spring characteristics of each of the contact pieces 42b vary, variation in contact area can be reduced and, as a result, variation in operating torque can be reduced.

Note that when the motor 34 rotates towards an unlocking side (withdrawal direction), the gear wheel 57 rotates counterclockwise (the direction opposite to the arrow A). In such a case, the pawl 41 remains in place due to the frictional force between the friction ring 42 and the small diameter ring portion 26c of the outer gear cover 26, hence the pawl 41 moves, in the pawl sliding groove 62a, relatively towards the inner side from the opening 62b as the gear wheel 57 rotates, and the engaging portion 41a of the pawl 41 separates from the inner teeth 53a of the clutch housing 50 and returns to the first position P1.

When the PP (pre-pretensioner) is operated (the motor 34 rotates in the retraction direction) and there is an input to the seatbelt in the withdrawal direction that is higher than a pre-set value in a state in which the engaging portion 41a of the pawl 41 and the inner teeth 53a of the clutch housing 50 are engaged, the thin fracturing portions 55 of the clutch housing 50 fracture so that only the boss portion 51, the square shaft 52 integral with the boss portion 51, and the flange portion 54 are rotatable, and transmission of power from the motor 34 to the spindle 12 is interrupted, thereby preventing the motor 34 from affecting the characteristics of the load limiter or the energy absorbing mechanism.

As described above, with the seatbelt retractor 10 of the present embodiment, the power transmission mechanism 19 which transmits power from the motor 34 to the spindle 12 is provided with the clutch housing 50, the pawls 41 which are capable of engaging with the clutch housing 50, the gear wheel 57 which holds the pawls 41 and rotates in accordance with the rotation of the motor 34, an outer gear cover 26, and a friction ring 42 which engages with the pawls 41 and is held on the outer gear cover 26 due to frictional force. The friction ring 42 includes the protruding portions 42a which engage with the engagement grooves 41b of the pawls 41, and a plurality of contact pieces 42b that come into contact with the outer peripheral surface of the small diameter ring portion 26c of the outer gear cover 26 and press against the outer peripheral surface towards the inner side in the radial direction. Accordingly, the friction ring 42 can be easily coupled to the outer gear cover 26 while the pawls 41 are held due to the contact between the outer peripheral surface of the small diameter ring portion 26c and the contact pieces 42b and, as a result, automation of the coupling operation can be easily addressed. Moreover, as contact between the outer peripheral surface of the small diameter ring portion 26c and the contact pieces 42b is tangential contact, resistance to abrasion is improved and durability is enhanced.

In particular, with the present embodiment, the frictional force described above acts between the outer peripheral surface of the small diameter ring portion 26c of the outer gear cover 26 and the contact pieces 42b of the friction ring 42.

Further, the contact pieces 42b each have a curved surface 42c extending in the tangential direction of the outer peripheral surface of the small diameter ring portion 26c, and the curved surface 42c presses against the outer peripheral surface of the small diameter ring portion 26c towards the inner side in the radial direction, hence the contact area between the outer peripheral surface of the small diameter ring portion 26c and the curved surface 42c is increased due to tangential contact and, even when there is variation among the spring characteristics of each of the respective contact pieces 42b, variation in contact area can be reduced and, as a result, variation in operating torque can be reduced.

Further, as the contact pieces 42b are formed by a bending process, processing is easier in comparison to when the conventional protruding portions 142c are provided.

Moreover, the outer gear cover 26 is provided with the large diameter ring portion 26b, which is formed concentrically with the small diameter ring portion 26c, on an outer side of the small diameter ring portion 26c in the radial direction. As the large diameter ring portion 26b is fitted, so as to be freely rotatable, to the gear wheel 57 as a bearing thereof, the coupling structure of the friction ring 42 and the outer gear cover 26 of the present embodiment can be designed without changing surrounding structures.

The seatbelt retractor described above is a preferred example of the present invention, and other embodiments can be implemented or executed by various methods. Unless specifically indicated in the specification of the present application, the present invention is not limited to the shapes, sizes, configuration arrangements, etc. of the detailed parts shown in the accompanying drawings. Moreover, the expressions and terms used in the specification of the present application are for the purpose of explanation and are not limited thereto unless specific indication is given to this effect.

Figure 10:
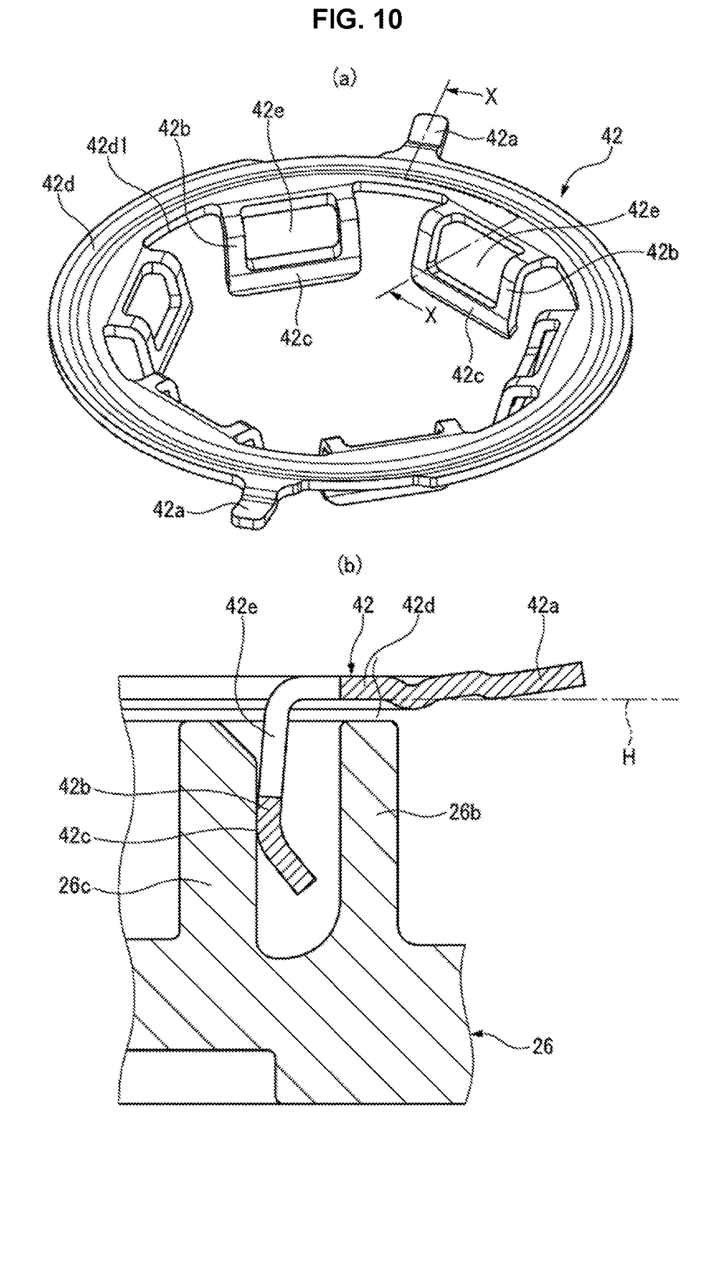
FIG. 10(a) is a perspective view of a friction ring of a modified example.
FIG. 10(b) is a main part cross-sectional view showing a state in which a contact piece of the friction ring is in contact with the outer peripheral surface of the cylindrical portion of the outer gear cover, taken along the X-X line of the friction ring.

FIGS. 10(a) and 10(b) show the friction ring 42 according to a modified example of the present invention. In this modified example, an opening 42e is formed in each of the contact pieces 42b. Due to this opening 42e, it is possible to adjust the spring force of the contact pieces 42b while securing contact area through tangential contact between the outer peripheral surface of the small diameter ring portion 26c and the curved surface 42c, and frictional contact force can be adjusted to an optimal level during the design phase. More specifically, as the spring force and, in turn, the frictional contact force can be reduced due to the openings 42e, the operating torque of the friction ring 42 can be adjusted. More specifically, the opening 42e is formed at least between the inner diameter side end 42d1 of the annular plate portion 42d and the curved surface 42c, that is, a contact portion, in the extension direction of the contact piece 42b.

Note that, in this modified example also, the friction ring 42 is, in consideration of operability when rotation begins, formed so as to be heavier than one of the pawls 41.

Further, the protruding portions 42a of the friction ring 42 in this modified example are inclined with respect to the horizontal plane H of the annular plate portion 42d in a direction separating from the bottom surface of the engagement grooves 41b of the pawls 41 (see FIGS. 6(a) and 6(b)) or, in other words, are inclined upward (in a direction opposite to the extension direction of the contact pieces 42b) with respect to the horizontal plane H of the annular plate portion 42d in FIG. 10(b).

Were the protruding portions 42a to be inclined downward (in the same direction as the extension direction of the contact pieces 42b) with respect to the horizontal plane H of the annular plate portion 42d, the contact pressure between the pawls 41 and the friction ring 42 would increase, and there is a possibility that the pawls 41 and the friction ring 42 would interfere with each other at times other than when necessary, and the movement of the pawls 41 would become unstable. For this reason, the contact pressure between the pawls 41 and the friction ring 42 can be reduced by inclining the protruding portions 42a slightly upward with respect to the horizontal plane H of the annular plate portion 42a.

Moreover, in the embodiment described above, the engagement groove 41b formed in the pawl 41 and the protruding portion 42a formed in the friction ring 42 are engaged with each other so as to allow relative movement of the pawl 41 with respect to the friction ring 42 in the radial direction, however, the present invention is not limited to such a configuration. In other words, in the present invention, as long as the second engaging portion of the pawl 41 and the other engaging portion of the friction ring 42 are engaged so as to allow relative movement of the pawl 41 with respect to the friction ring 42 in the radial direction, other configurations may also be used.

Moreover, in the embodiment described above, the engaging portion 41a of the pawl 41 is a structure which is capable of meshing with the inner teeth 53a formed on the inner peripheral side of the clutch housing 50, such that power from the electric actuator can be transmitted to the spindle 12, however, the present invention is not limited to such a configuration. In other words, in the present invention, as long as the portion to be engaged of the clutch housing 50 and the first engaging portion of the pawl 41 engage with/disengage from each other so that power from the electric actuator can be transmitted to the spindle 12 and power transmitted from the electric actuator to the spindle can be interrupted, other configurations may also be used.

In addition, in the embodiment described above, the pawl 41 is held, so as to be movable, by the pawl sliding groove 62a, however, as long as a holding portion in the present invention holds the pawl 41 so as to be movable, other configurations may also be used, i.e. the configuration of the present invention is not limited to that which is described above.

While the above description constitutes the preferred embodiment of the present invention, it will be appreciated that the invention is susceptible to modification, variation and change without departing from the proper scope and fair meaning of the accompanying claims.

The invention claimed is:

1. A seatbelt retractor comprising:
a spindle for retracting a seatbelt;
an electric actuator which generates power for rotating the spindle; and
a power transmission mechanism which is capable of transmitting power from the electric actuator to the spindle,
the power transmission mechanism including,
a clutch housing which rotates together with the spindle and includes a portion to be engaged,
a pawl which includes a first engaging portion that is capable of engaging with the portion to be engaged of the clutch housing,
a gear wheel which includes a holding portion for holding the pawl so as to be movable, and is disposed so as to oppose the clutch housing, and rotates with the rotation of the electric actuator,
an outer gear cover which houses the clutch housing and the gear wheel, and a friction ring which engages with the pawl while allowing relative movement of the pawl in a radial direction and is held on the outer gear cover due to a frictional force, wherein a clutch mechanism, which switches between a first mode in which power from the electric actuator can be transmitted to the spindle and a second mode in which the transmission of power from the electric actuator to the spindle can be interrupted, by engagement or disengagement between the portion to be engaged of the clutch housing and the first engaging portion of the pawl, and the friction ring is provided with a third portion which engages with a second engaging portion of the pawl so as to allow relative movement of the pawl in the radial direction, and a plurality of contact pieces which come into contact with an outer peripheral surface of a cylindrical portion formed on the outer gear cover and press against the outer peripheral surface inwardly in the radial direction.

2. The seatbelt retractor according to claim 1, further comprising, wherein, the frictional force acts between the outer peripheral surface of the cylindrical portion of the outer gear cover and the contact pieces of the friction ring.

3. The seatbelt retractor according to claim 1, further comprising, each of the contact pieces extends in an axial direction from an inner diameter side of an annular plate portion of the friction ring, and includes a contact portion which extends in a tangential direction of the outer peripheral surface of the cylindrical portion, and the contact portions press against the outer peripheral surface of the cylindrical portion inwardly in the radial direction.

4. The seatbelt retractor according to claim 3, further comprising, an opening is formed in each of the contact pieces.

5. The seatbelt retractor according to claim 4, further comprising, the opening is formed at least between an inner diameter side end portion of the annular plate portion and the contact portion in the extension direction of the contact piece.

6. The seatbelt retractor according to claim 1, further comprising, the outer gear cover is provided with a second cylindrical portion which is formed concentrically with the cylindrical portion on an outer side of the cylindrical portion in the radial direction, and the gear wheel is fitted to the second cylindrical portion so as to be freely rotatable.

7. The seatbelt retractor according to claim 1, further comprising, the second engaging portion is an engagement groove formed in the pawl, and the third portion is a protruding portion formed on the friction ring.

8. The seatbelt retractor according to claim 7, further comprising, the protruding portion is inclined with respect to a horizontal plane of an annular plate portion of the friction ring in a direction separating from the engagement groove.

9. The seatbelt retractor according to claim 1, further comprising, the friction ring is heavier than one of the pawls.

10. The seatbelt retractor according to claim 1, further comprising, the portion to be engaged of the clutch housing is an inner tooth formed on an inner peripheral side of the clutch housing, and the first engaging portion of the pawl is a structure which is capable of meshing with the inner tooth.

11. The seatbelt retractor according to claim 1, further comprising, the contact pieces formed to have a substantially v-shaped cross-section which extends in an axial direction and inclined inwardly in the radial direction and reverses to incline outwardly in the radial direction.

* * * * *